(12) United States Patent
Imakura et al.

(10) Patent No.: US 11,279,161 B2
(45) Date of Patent: Mar. 22, 2022

(54) THERMAL TRANSFER SHEET (71) Applicant: Dai Nippon Printing Co., Ltd., Tokyo (JP)

(72) Inventors: Yuzu Imakura, Shinjuku-Ku (JP); Junko Hirokawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/607,422

(22) PCT Filed: Feb. 28, 2018

(86) PCT No.: PCT/JP2018/007551
§ 371 (c)(1),
(2) Date: Oct. 23, 2019

(87) PCT Pub. No.: WO2019/038960
PCT Pub. Date: Feb. 28, 2019

(65) Prior Publication Data
US 2020/0130394 A1     Apr. 30, 2020

(30) Foreign Application Priority Data

Aug. 24, 2017   (JP) .............................. JP2017-161225

(51) Int. Cl.
*B41M 5/44* (2006.01)
*B32B 27/30* (2006.01)

(52) U.S. Cl.
CPC ............. *B41M 5/44* (2013.01); *B32B 27/30* (2013.01); *B32B 27/306* (2013.01); *B32B 2250/04* (2013.01); *B41M 2205/06* (2013.01); *B41M 2205/30* (2013.01); *B41M 2205/38* (2013.01); *Y10T 428/24893* (2015.01); *Y10T 428/24942* (2015.01)

(58) Field of Classification Search
CPC ................ Y10T 428/24893; Y10T 428/24942
USPC ......................................................... 428/32.6
See application file for complete search history.

(56) References Cited

U.S. PATENT DOCUMENTS

| 4,627,997 A | * | 12/1986 | Ide ......................... B41M 5/385 347/217 |
| 5,977,208 A | | 11/1999 | Syutara et al. |
| 5,985,422 A | | 11/1999 | Krauter |

(Continued)

FOREIGN PATENT DOCUMENTS

| EP | 1 958 787 A1 | 8/2008 | |
| JP | 63281890 A | * 11/1988 | ........ B41M 5/38228 |

(Continued)

OTHER PUBLICATIONS

Chemical Book, Carbon Black (Year: 2017).*

(Continued)

*Primary Examiner* — Betelhem Shewareged
(74) *Attorney, Agent, or Firm* — Burr & Brown, PLLC (57) ABSTRACT

Provided is a thermal transfer sheet having an excellent high-speed transferability and capable of forming images with high fluorescence intensity and abrasion resistance. The thermal transfer sheet of the present invention includes a substrate, a fluorescent layer, and a thermofusible ink layer in this order, in which the fluorescent layer contains a fluorescent material, and a vinyl resin.

14 Claims, 1 Drawing Sheet

(56) References Cited

U.S. PATENT DOCUMENTS

| | | | | |
|---|---|---|---|---|
| 2001/0004509 A1* | 6/2001 | Hayashi | ................ | B41M 5/385 430/200 |
| 2009/0130348 A1* | 5/2009 | Yamashita | ............... | B41M 5/44 428/32.64 |
| 2018/0229528 A1 | 8/2018 | Yoneyama et al. | | |

FOREIGN PATENT DOCUMENTS

| JP | S63-281890 A1 | 11/1988 | | |
|---|---|---|---|---|
| JP | S63-283986 A1 | 11/1988 | | |
| JP | H03-034894 A1 | 2/1991 | | |
| JP | H08-002719 B2 | 1/1996 | | |
| JP | H09-323480 A1 | 12/1997 | | |
| JP | H11-321136 A1 | 11/1999 | | |
| JP | 2001-219654 A1 | 8/2001 | | |
| JP | 2001-232955 A1 | 8/2001 | | |
| JP | 2001232955 A * | 8/2001 | ............. | B41J 2/325 |
| JP | 2001-322360 A1 | 11/2001 | | |
| JP | 2002-113961 A1 | 4/2002 | | |
| JP | 2002-166657 A1 | 6/2002 | | |
| JP | 2004-284155 A1 | 10/2004 | | |
| JP | 3153024 U | 8/2009 | | |
| JP | 2015-091647 A1 | 5/2015 | | |
| WO | 2017/029859 A1 | 2/2017 | | |

OTHER PUBLICATIONS

English Translation of the International Preliminary Report on Patentability (Chapter I) (Application No. PCT/JP2018/007551) dated Mar. 5, 2020, 9 pages.
International Search Report and Written Opinion (Application No. PCT/JP2018/007551) dated Apr. 24, 2018.
Chinese Office Action (Application No. 201880044394.7) dated Dec. 24, 2020 (with English translation).
Extended European Search Report (Application No. 18847786.3) dated Dec. 16, 2020.

\* cited by examiner

THERMAL TRANSFER SHEET

FIELD OF THE INVENTION

The present invention relates to a thermal transfer sheet, more particularly to a thermal transfer sheet including a substrate, a fluorescent layer, and a thermofusible ink layer.

BACKGROUND OF THE INVENTION

A thermofusible transfer system is conventionally known, the system comprising applying energy to a thermal transfer sheet comprising a substrate, such as a resin film, and a thermofusible ink layer containing a colorant via a thermal head or the like, and transferring the thermofusible ink layer to a transfer object, such as paper or a plastic sheet, to form an image.

The system, which can produce images with high density and excellent sharpness, is suitable for recording binary images, such as character patterns and line drawings. Furthermore, the system enables recording of variable information, such as addresses, customer information, numberings and bar codes, on a transfer object using a computer and a thermofusible transfer printer.

For use in image formation, such as in documents, vouchers, and cards that require protection from counterfeiting and falsification, a thermal transfer sheet containing, in its thermofusible ink layer, a fluorescent material that is transparent or colorless under visible light but emits visible light after irradiation with, for example, infrared or ultraviolet light has been disclosed (Patent Document 1).

However, there has been a problem with the thermal transfer sheet disclosed in the Patent Document 1 from the viewpoint of the fluorescence intensity of fluorescent materials in formed images. In order to solve the problem, Patent Document 2 has disclosed a thermal transfer sheet comprising a fluorescent layer in addition to a thermofusible ink layer.

PRIOR ART REFERENCES

Patent Documents

Patent Document 1: Japanese Examined Patent Application Publication No. 8-2719
Patent Document 2: Japanese Registered Utility Model No. 3153024

SUMMARY OF THE INVENTION

Problems to be Solved by the Invention

Recently, thermal transfer sheets have been intensively demanded to have high-speed transferability with which no printing omission or faint printing occurs even at highly set printing speed.

The present inventors found that the high-speed transferability of the thermal transfer sheet including a fluorescent layer in addition to a thermofusible ink layer suggested in Patent Document 2 has room for improvement.

In view of the above, an object of the present invention is to provide a thermal transfer sheet having an excellent high-speed transferability and capable of forming images with improved fluorescence intensity and abrasion resistance.

Means for Solving the Problems

The thermal transfer sheet of the present invention includes a substrate, a fluorescent layer, and a thermofusible ink layer in this order, wherein the fluorescent layer contains a fluorescent material, and a vinyl resin.

In one embodiment, fluorescence intensities A and B satisfy the following formula:

$$B/A \geq 3,$$

wherein the fluorescence intensity A is obtained by irradiating the thermal transfer sheet with an ultraviolet light at an excitation wavelength of 365 nm from the side provided with the thermofusible ink layer, where the substrate is arranged at the center; thereby making the fluorescent layer emit a light; and then measuring the fluorescence intensity at 470 nm using a fluorescence spectrophotometer, and wherein the fluorescence intensity B is obtained by irradiating the thermal transfer sheet with an ultraviolet light at an excitation wavelength of 365 nm from the side not provided with the thermofusible ink layer, where the substrate is arranged at the center; thereby making the fluorescent layer emit a light, and then measuring the fluorescence intensity at 470 nm using a fluorescence spectrophotometer.

In one embodiment, the vinyl resin contained in the fluorescent layer is at least one of polyvinyl alcohol, polyvinylpyrrolidone, and vinyl acetate-vinylpyrrolidone copolymer.

In one embodiment, the fluorescent layer has a thickness of 0.1 μm or more and 1.5 μm or less.

In one embodiment, the content of the fluorescent material in the fluorescent layer is 0.1% by mass or more and 60% by mass or less.

In one embodiment, the thermal transfer sheet further includes a peeling layer between the substrate and the fluorescent layer.

In one embodiment, the fluorescent layer contains a first particle and a second particle that is different from the first particle.

In one embodiment, the first particle is a filler having a melting point of 120° C. or higher.

In one embodiment, the primary particle size of the first particle is 0.1 μm or more and 2 μm or less.

In one embodiment, the second particle has a melting point of less than 120° C.

In one embodiment, the second particle is wax.

In one embodiment, the sum of the contents of the first particle and the second particle in the fluorescent layer is 15% by mass or more and 65% by mass or less.

In one embodiment, the peeling layer contains a vinyl resin.

In one embodiment, the content of the vinyl resin in the peeling layer is 2% by mass or more and 25% by mass or less.

Effect of the Invention

The present invention can provide a thermal transfer sheet capable of forming good images without printing omission or faint printing even at highly set printing speed, or having high-speed transferability.

The present invention can also provide a thermal transfer sheet capable of forming images with improved fluorescence intensity and abrasion resistance.

DETAILED DESCRIPTION OF THE INVENTION (Thermal Transfer Sheet)

Figure 1:
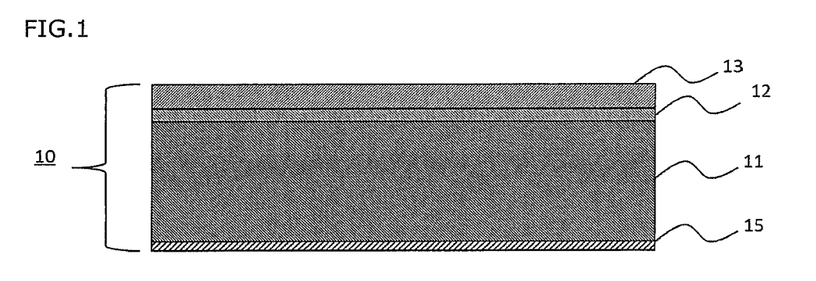
FIG. 1 is a schematic sectional view showing a thermal transfer sheet in one embodiment of the present invention.
Figure 2:
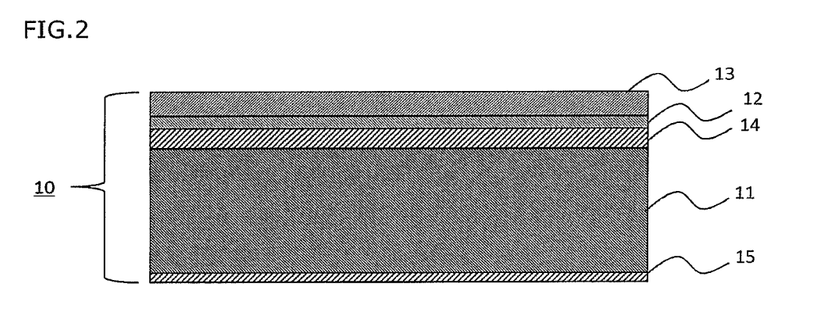
FIG. 2 is a schematic sectional view showing a thermal transfer sheet in one embodiment of the present invention.

As shown in FIG. 1, a thermal transfer sheet 10 of the present invention include a substrate 11, a fluorescent layer 12, and a thermofusible ink layer 13 in this order. In one embodiment of the present invention, the thermal transfer sheet 10 may include a peeling layer 14 between the substrate 11 and the fluorescent layer 12, as shown in FIG. 2. In one embodiment of the present invention, the thermal transfer sheet 10 may include a backing layer 15, as shown in FIGS. 1 and 2.

In one embodiment, fluorescence intensities A and B satisfy the following formula (1):

$$B/A \geq 3 \quad (1),$$

wherein the fluorescence intensity A is obtained by irradiating the thermal transfer sheet with an ultraviolet light at an excitation wavelength of 365 nm from the side provided with the thermofusible ink layer, where the substrate is arranged at the center; thereby making the fluorescent layer emit a light; and then measuring the fluorescence intensity at 470 nm using a fluorescence spectrophotometer, and wherein the fluorescence intensity B is obtained by irradiating the thermal transfer sheet with an ultraviolet light at an excitation wavelength of 365 nm from the side not provided with the thermofusible ink layer, where the substrate is arranged at the center; thereby making the fluorescent layer emit a light, and then measuring the fluorescence intensity at 470 nm using a fluorescence spectrophotometer.

More preferably, the fluorescence intensities A and B satisfy the following formula (2):

$$B/A \geq 3.5 \quad (2)$$

When the fluorescence intensities A and B satisfy the above formula, the thermal transfer sheet of the present invention can be used to obtain images with sufficient fluorescence intensity.

Furthermore, for example, when the thermal transfer sheet of the present invention is wound such that, when the substrate is considered as the center, the side provided with the thermofusible ink layer is positioned outside, and the side not provided with the thermofusible ink layer is positioned inside, then the image formed by the thermal transfer sheet in the wound state can be prevented from being known to a third person that the image emits visible light via irradiation with, for example, infrared or ultraviolet light.

In one embodiment, the fluorescence intensity B is preferably 10 or more, more preferably 15 or more.

Hereinafter, the layers provided in the thermal transfer sheet of the present invention will be described.

(Substrate)

The substrate can be employed with no limitation as long as it has heat resistance such that it is resistant under heat energy (e.g., heat generated by a thermal head) to be applied during heat transfer, and mechanical strength such that it can support a peeling layer and the like provided on the substrate, as well as solvent resistance.

Examples of the substrate that can be used include films composed of polyester resins such as polyethylene terephthalate (PET), polybutylene terephthalate (PBT), polyethylene naphthalate (PEN), polyethylene terephthalate-isophthalate copolymer, and terephthalic acid-cyclohexanedimethanol-ethylene glycol copolymer, polyamide resins such as nylon 6 and nylon 6,6, polyolefin resins such as polyethylene (PE), polypropylene (PP), and polymethylpentene, vinyl resins such as polyvinyl chloride, polyvinyl alcohol (PVA), polyvinyl acetate, vinyl chloride-vinyl acetate copolymer, polyvinyl butyral, and polyvinylpyrrolidone (PVP), (meth)acrylic resins such as polyacrylate, polymethacrylate, and polymethyl methacrylate, polyimide resins such as polyimide and polyetherimide, styrene resins, cellulose resins such as cellophane, cellulose acetate, nitrocellulose, cellulose acetate propionate (CAP), and cellulose acetate butyrate (CAB) (hereinafter referred to as "resin films").

Among the above-mentioned resins, polyester resins such as PET and PEN are preferable, and PET is particularly preferable from the viewpoint of heat resistance and mechanical strength.

As used herein, the term "(meth)acryl" means inclusion of both "acryl" and "methacryl."

A laminate of the above-mentioned resin films can be also employed as the substrate.

The laminate of the resin films may be produced by using a dry lamination method, a wet lamination method, or an extrusion method.

When the substrate is a resin film, the resin film may be a stretched film or an unstretched film, and a stretched film that is stretched uniaxially or biaxially is preferably employed from the viewpoint of strength.

In addition, from the viewpoints of improvement of the adhesion to, for example, the fluorescent layer, and the backing layer and improvement of the blocking resistance, the substrate preferably has irregularities on its surface.

As means for forming irregularities on the substrate surface, for example, mat material kneading processing, sand blasting processing, hairline processing, mat coating processing, and chemical etching processing can be exemplified. Mat material kneading processing is a processing method for forming a substrate with a resin kneaded with an inorganic substance or an organic substance. Mat coating processing is a processing method for coating a substrate surface with a coating material containing an organic substance or inorganic substance, thereby forming irregularities on the substrate surface.

The thickness of the substrate is preferably 2.0 µm or more and 12.0 µm or less, more preferably 3.0 µm or more and 6.0 µm or less. When the thickness of the substrate is adjusted within the numerical ranges, the substrate can provide improved mechanical strength and improved heat energy transfer during heat transfer.

In the present invention, the thicknesses of layers constituting the thermal transfer sheet have been measured by using an embedding-in-resin method.

Specifically, a thermal transfer sheet after being cut (test piece) has been embedded in an epoxy resin. Then, the test piece has been cut in the thickness direction by ultramicrotomy (cutting using a microtome and a diamond cutter) to form a section. After ion sputtering (E-1045, produced by Hitachi High-Technologies Corporation; sputtering target: Pt, Current: 15 mA, 10 seconds) on the section, a scanning electron microscope (S-4800 TYPE I, produced by Hitachi High-Technologies Corporation; Acceleration voltage: 3.0 kv, Emission current: 10 µA, working distance: 8 mm, Detector: Mix) has been used to obtain a sectional image of the test piece. The obtained test piece has been used for measurement.

(Fluorescent Layer)

The fluorescent layer comprises a fluorescent material and a vinyl resin.

As used herein, the term "fluorescent material" refers to a material that is transparent or colorless under visible light but emits visible light under a certain spectral range of light (e.g., infrared or ultraviolet light) irradiation. As used herein, the term "visible light" spectrum refers to a wavelength spectrum of more than 400 nm and less than 750 nm, and the term "infrared light" spectrum refers to a wavelength spectrum of 750 nm or more and 2500 nm or less, and the term "ultraviolet light" spectrum refers to a wavelength spectrum of 280 nm or more and 400 nm or less.

As used herein, the term "vinyl resins" include (1) homopolymers of a monomer having a vinyl group, (2) copolymers of monomers having two or more vinyl groups, and (3) copolymers of a monomer having a vinyl group and a monomer with no vinyl group.

It is noted that the term "vinyl groups" do not include groups such as acryloyl and styrene, and thus the term "vinyl resins" do not include (meth)acrylic resins and styrene resins.

The fluorescent material may be an organic fluorescent material or an inorganic fluorescent material. Since organic fluorescent materials are compatible with binder resins and excellent in invisibility under visible light, organic fluorescent materials are preferably used when it is undesirable to be known that there are printings applied with a fluorescent material from the viewpoint of forgery prevention and the like. The fluorescent layer may contain two or more fluorescent materials.

Examples of the organic fluorescent material include diaminostilbene disulfonic acid derivatives, imidazole derivatives, coumarin derivatives, biphenyl derivatives, triazole derivatives, carbazole derivatives, pyridine derivatives, imidazolone derivatives, dyes such as fluorescein and eosin, and compounds having a benzene ring(s) such as anthracene.

The inorganic fluorescent material used is obtained by firing a combination of an inorganic crystal fluorescent substance such as an oxide, sulfide, silicate, phosphate, or tungstate of Ca, Ba, Mg, Zn, Cd or the like as a main component, and a metal element such as Mn, Zn, Ag, Cu, Sb, or Pb or a rare earth element such as lanthanoid as an activator.

Specific examples include $BaSi_2O_5$: Pb, $Sr_2P_2O_7$: Eu, $BaMg_2Al_{16}O_{27}$: Eu, $MgWO_4$, $3Ca_3(PO_4)_2.Ca(F, Cl)_2$: Sb,Mn, $MgGa_2O_4$: Mn, $Zn_2SiO_4$, (Ce, Tb)$MgAl_{11}O_{19}$, $Y_2SiO_5$: Ce,Tb, $Y_2O_3$: Eu, $YVO_4$: Eu, (Sr, Mg, Ba)$_3(PO_4)_2$: Sn, $3.5MgO.5MgF_2.GeO_2$: Mn.

The content of the fluorescent material in the fluorescent layer is preferably 0.5% by mass or more and 60% by mass or less, more preferably 0.7% by mass or more and 55% by mass or less, still more preferably 1.5% by mass or more and 45% by mass or less.

When the content of the fluorescent material is within the numerical ranges described above, images formed using the thermal transfer sheet of the present invention can have both sufficient fluorescence intensity and abrasion resistance.

Examples of the monomer having a vinyl group include, but not limited to, vinyl chloride, vinyl bromide, vinyl acetate, vinyl propionate, vinyl butyrate, vinyl laurate, vinylidene chloride, N-vinylpyridine, N-vinyl-2-pyrrolidone, and N-vinylcarbazole. Among them, N-vinyl-2-pyrrolidone is preferably used from the viewpoint of high-speed transferability of the thermal transfer sheet of the present invention.

Specific examples of the vinyl resin include polyvinyl chloride, polyvinyl bromide, polyvinyl acetate, polyvinyl propionate, polyvinyl butyrate, polyvinyl laurate, polyvinylidene chloride, PVA, polyvinylphenol, polyvinyl acetate, polyvinyl butyral, polyvinylpyrrolidone (PVP), vinyl chloride-vinyl acetate copolymers, and vinyl acetate-vinylpyrrolidone copolymers (PVP-VA).

Among them, preferably used are PVA, PVP, and PVP-VA, particularly preferably PVP-VA, from the viewpoint of high-speed transferability of the thermal transfer sheet of the present invention.

The fluorescent layer may contain two or more of the vinyl resins described above.

The content of the vinyl resin in the fluorescent layer is preferably 30% by mass or more and 85% by mass or less, more preferably 40% by mass or more and 80% by mass or less.

When the content of the vinyl resin is within the numerical range described above, the thermal transfer sheet of the present invention can have further improved high-speed transferability.

The fluorescent layer may contain a binder resin in addition to the vinyl resin. Specific examples of the binder resin include (meth)acrylic resins, polyolefin resins, polyester resins, polyurethane resins, cellulose resins, amide resins, terpene resins and phenol resins.

In one embodiment, the fluorescent layer contains a first particle and a second particle that is different from the first particle. Surprisingly, the presence of two types of particles in the fluorescent layer may lead to effective prevention of excessive peeling (excessive peeling resistance), which results from transfer of the thermofusible ink layer to a portion where transfer should not occur during formation of an image using the thermal transfer sheet, and results in crushing of images.

The sum of the contents of the first particle and the second particle in the fluorescent layer is 15% by mass or more and 65% by mass or less, more preferably 18% by mass or more and 63% by mass or less, still more preferably 20% by mass or more and 60% by mass or less. When the sum of the contents is within the ranges, the thermal transfer sheet of the present invention can have further improved excessive peeling resistance.

Preferably, the first particle is a filler having a melting point of 120° C. or higher. From the viewpoint of excessive peeling resistance, the melting point of the filler is more preferably 140° C. or higher, still more preferably 150° C. or higher.

The primary particle size of the first particle is preferably 0.1 μm or more and 2 μm or less, more preferably 0.4 μm or more and 1.2 μm or less. When the primary particle size is within the ranges, the thermal transfer sheet of the present invention can have further improved excessive peeling resistance.

In the present invention, the primary particle size can be determined by a method of directly measuring the primary particle size from an electron micrograph of a vertical section of the thermal transfer sheet. Specifically, the short-axis diameter and the long-axis diameter of a primary particle are measured, and the mean of the diameters is considered as the particle size of the particle. Similarly, 100 particles are measured for their diameters, and the mean thereof is considered as the primary particle size.

The same results can be obtained using either a transmission electron microscope (TEM) or a scanning electron microscope (SEM).

Examples of the first particle include thermoplastic resin particles such as benzoguanamine-formaldehyde copolymers, benzoguanamine-melamine-formaldehyde copolymers and melamine-formaldehyde copolymers, (meth) acrylic resin particles, silicon-containing resin particles (silicone), fluorine-containing resin particles, and inorganic material particles such as silica, alumina, clay, talc, calcium carbonate, barium oxide, zinc oxide, titanium oxide and glass bead.

The first particle used may be commercially-available, including EPOSTAR® S6, EPOSTAR® S, and EPOSTAR® S12, produced by Nippon Shokubai Co., Ltd., TOSPEARL® 120, produced by Momentive Performance Materials Inc., MX-40T, produced by Soken Chemical & Engineering Co., Ltd., QCB-100, produced by Shin-Etsu Chemical Co., Ltd., and KTL-500F, produced by Kitamura Limited.

The content of the first particle of the fluorescent layer is preferably 5% by mass or more and 35% by mass or less, more preferably 8% by mass or more and 33% by mass or less, still more preferably 10% by mass or more and 30% by mass or less. When the content is within the ranges, the thermal transfer sheet of the present invention can have further improved excessive peeling resistance.

Preferably, the melting point of the second particle contained in the fluorescent layer is less than 120° C. When the melting point is below the temperature, the thermal transfer sheet of the present invention can have further improved excessive peeling resistance.

From the viewpoint of excessive peeling resistance, the melting point of the second particle is more preferably 110° C. or lower, still more preferably 100° C. or lower.

The melting point of the second particle is preferably 40° C. or higher, more preferably 50° C. or higher. When the melting point is above the temperatures, the thermal transfer sheet can have improved blocking resistance.

Examples of the second particle include natural waxes such as bees wax, spermaceti, japan wax, rice wax, carnauba wax, candelilla wax and montan wax; synthetic waxes such as paraffin wax, microcrystalline wax, oxidized wax, ozokerite, ceresin, ester wax and polyethylene wax; higher saturated fatty acids such as margaric acid, lauric acid, myristic acid, palmitic acid, stearic acid, and behenic acid; higher saturated monohydric alcohols such as stearyl alcohol and behenyl alcohol; monohydric alcohols such as sorbitan fatty acid ester; and higher fatty acid amides such as stearic acid amide and oleic acid amide.

Among them, carnauba wax and paraffin wax are preferred from the viewpoint of excessive peeling resistance.

The second particle used may be commercially available, including WE-65 and WE-95 produced by Konishi Co., Ltd.

The content of the second particle of the fluorescent layer is preferably 5% by mass or more and 35% by mass or less, more preferably 8% by mass or more and 33% by mass or less, still more preferably 10% by mass or more and 30% by mass or less. When the content is within the range, the thermal transfer sheet of the present invention can have further improved excessive peeling resistance.

The ratio of the first particle to the second particle contained in the fluorescent layer (the content of the first particle/the content of the second particle) is preferably 1/5 or more and 5/1 or less on a mass basis, more preferably 1/3 or more and 3/1 or less. When the ratio is within the range, the thermal transfer sheet of the present invention can have further improved excessive peeling resistance.

In one embodiment, the fluorescent layer may contain additives such as the above-described waxes, fillers, plasticizers, antistatic agents, and ultraviolet absorbers as long as they do not impair the characteristics of the present invention.

The thickness of the fluorescent layer is preferably 0.1 μm or more and 1.5 μm or less, more preferably 0.2 μm or more and 1.0 μm or less. When the thickness of the fluorescent layer is within the numerical ranges described above, the thermal transfer sheet of the present invention can have further improved high-speed transferability and abrasion resistance, and images formed with the thermal transfer sheet can have further improved fluorescence intensity.

The fluorescent layer can be formed by dispersing or dissolving the above-described materials in water or a suitable solvent to prepare a fluorescent layer-forming coating solution, applying the coating solution on the substrate or the peeling layer by known means, such as a roll coater, a reverse roll coater, a gravure coater, a reverse gravure coater, a bar coater or a rod coater, to form a film, and drying the film.

(Thermofusible Ink Layer)

The thermofusible ink layer comprises a colorant and a binder.

The colorant contained in the thermofusible ink layer can be selected appropriately from carbon blacks, inorganic pigments, organic pigments and dyes according to the required color tone.

For example, when the thermal transfer sheet of the present invention is used in bar code printing, colorants that have sufficient black density and do not discolor or fade due to light, heat, or the like are particularly preferred. Examples of such colorants include carbon blacks such as lamp black, graphite and nigrosine dyes. When the thermal transfer sheet of the present invention is used for color printing, other chromatic dyes or pigments are used. When the thermal transfer sheet of the present invention is used for white color printing, titanium oxide, calcium carbonate or the like is used.

The content of the colorant in the thermofusible ink layer is preferably 10% by mass or more and 60% by mass or less, more preferably 20% by mass or more and 50% by mass or less. When the content of the colorant is within the numerical ranges, images having high visibility can be formed.

Examples of the binder contained in the thermofusible ink layer include the waxes and the binder resins described above.

The content of the binder resin in the thermofusible ink layer is preferably 30% by mass or more and 80% by mass or less, more preferably 40% by mass or more and 80% by mass or less.

In one embodiment, the thermofusible ink layer may contain additives such as fillers, plasticizers, antistatic agents, and ultraviolet absorbers, as long as they do not impair the characteristics of the present invention.

The thickness of the thermofusible ink layer is preferably 0.3 μm or more and 5.0 μm or less, more preferably 0.5 μm or more and 2.0 μm or less.

The thermofusible ink layer can be formed by dispersing or dissolving the above-described materials in water or a suitable solvent to prepare a thermofusible ink layer-forming coating solution, applying the coating solution on the fluorescent layer by known means, such as a roll coater, a reverse roll coater, a gravure coater, a reverse gravure coater, a bar coater or a rod coater, to form a film, and drying the film.

(Peeling Layer)

In one embodiment, the thermal transfer sheet of the present invention includes a peeling layer on the substrate.

When the thermal transfer sheet includes a peeling layer, which is transferred to a transfer object during thermal transfer printing, the thermal transfer sheet of the present invention can have improved transfer properties.

In one embodiment, the peeling layer contains a wax. Waxes that can be used are as described above. Among the waxes, the peeling layer preferably contains a carnauba wax or a paraffin wax. When the peeling layer contains the wax, the thermal transfer sheet of the present invention can have improved transfer properties.

Preferably, the peeling layer contains the same wax as that contained in the fluorescent layer. This leads to improvement of the adhesion between the peeling layer and the fluorescent layer and enhancement of the blocking resistance of the thermal transfer sheet of the present invention.

The peeling layer may contain two or more of the waxes.

The content of the wax in the peeling layer is preferably 60% by mass or more and 98% by mass or less, more preferably 75% by mass or more and 95% by mass or less. When the content within the ranges, the thermal transfer sheet of the present invention can have improved transfer properties.

In one embodiment, the peeling layer contains a binder resin. Examples of the binder resin include vinyl resins such as polyvinyl chloride, polyvinyl acetate, PVA, polyvinylpyrrolidone (PVP), vinyl chloride-vinyl acetate copolymers, and vinyl acetate-vinylpyrrolidone copolymers (PVP-VA), polyester resins such as PET, PBT and PEN, polyamide resins such as such as nylon 6 and nylon 6,6, polyolefin resins such as PE, PP, and polymethylpentene, (meth)acrylic resins, polyolefin resins, polyester resins, polyurethane resins, cellulose resins, amide resins, terpene resins, and phenol resins.

Among the binder resins described above, the peeling layer preferably contains a vinyl resin, more preferably PVA, PVP, or PVP-VA, particularly preferably PVP-VA. This leads to improvement of the adhesion between the peeling layer and the fluorescent layer and enhancement of the blocking resistance of the thermal transfer sheet of the present invention.

The peeling layer may contain two or more of the binder resins described above.

The content of the binder resin in the peeling layer is preferably 2% by mass or more and 25% by mass or less, more preferably 5% by mass or more and 20% by mass or less, still more preferably 6% by mass or more and 15% by mass or less. When the content is within the ranges, the thermal transfer sheet of the present invention can have further improved high-speed transferability and blocking resistance.

The peeling layer may also contain a rubber such as isoprene rubber, butyl rubber or nitrile rubber. When the peeling layer contains a rubber, the flexibility of the peeling layer can be improved, and the adhesion between the thermal transfer sheet and the transfer object can be improved.

The thickness of the peeling layer is preferably 0.1 µm or more and 5.0 µm or less, more preferably 0.3 µm or more and 3.0 µm or less. When the thickness is within the ranges, the thermal transfer sheet of the present invention can have further improved blocking resistance.

The peeling layer can be formed by dispersing or dissolving the above-described materials in water or a suitable solvent to prepare a peeling layer-forming coating solution, applying the coating solution on the substrate by known means, such as a roll coater, a reverse roll coater, a gravure coater, a reverse gravure coater, a bar coater or a rod coater, to form a film, and drying the film.

(Backing Layer)

In one embodiment of the present invention, the thermal transfer sheet includes a backing layer on one side of the substrate, which has not been provided with the thermofusible ink layer. When the thermal transfer sheet includes a backing layer, sticking and/or wrinkling caused by heating during thermal transfer can be prevented.

In one embodiment, the backing layer contains a binder resin. Examples of the binder resin include cellulose resins, styrene resins, vinyl resins, polyester resins, polyurethane resins, silicone-modified urethane resins, silicone resins, fluorine-modified urethane resins, and (meth)acrylic resins.

Among them, silicone resins, in particular, acrylic-modified silicone resins are preferred from the viewpoint of prevention of burning of the backing layer onto the thermal head, and of generation of residuum.

In one embodiment, the backing layer also includes, as a binder resin, a two-part curable resin which is hardened in combination with, for example, an isocyanate compound. Examples of such a resin include polyvinyl acetal resins such as polyvinyl acetal and polyvinyl butyral.

Any conventionally known isocyanate compounds may be used as the isocyanate compound. Among such compound, it is desirable to use adducts of aromatic isocyanates. Examples of aromatic polyisocyanates include 2,4-toluene diisocyanate, 2,6-toluene diisocyanate, and a mixture of 2,4-toluene diisocyanate and 2,6-toluene diisocyanate; 1,5-naphthalene diisocyanate, tolidine diisocyanate, p-phenylene diisocyanate, trans-cyclohexane-1,4-diisocyanate, xylylene diisocyanate, triphenylmethane triisocyanate, and tris(isocyanate phenyl)thiophosphate. In particular, 2,4-toluene diisocyanate, 2,6-toluene diisocyanate, and a mixture of 2,4-toluene diisocyanate and 2,6-toluene diisocyanate are preferable.

In one embodiment, the backing layer contains an inorganic or organic fine particle. When the backing layer contains such a fine particle, sticking and/or wrinkling caused by heating during thermal transfer can be prevented.

Examples of the inorganic fine particles include clay minerals such as talc and kaolin; carbonate salts such as calcium carbonate and magnesium carbonate; hydroxides such as aluminum hydroxide and magnesium hydroxide; sulfate salts such as calcium sulfate; oxides such as silica; graphite; niter; and boron nitride.

Examples of the organic fine particles include organic resin fine particles composed of (meth)acrylic resins, TEFLON® resins, silicone resins, lauroyl resins, phenol resins, acetal resins, styrene resins or polyamide resins, and crosslinked resin fine particles obtained by reacting them with a crosslinker.

The thickness of the backing layer is preferably 0.01 µm or more and 5.0 µm or less, more preferably 0.03 µm or more and 2 µm or less.

The backing layer can be formed by dispersing or dissolving the above-described materials in water or a suitable solvent to prepare a backing layer-forming coating solution, applying the coating solution on the substrate by known means, such as a roll coater, a reverse roll coater, a gravure coater, a reverse gravure coater, a bar coater or a rod coater, to form a film, and drying the film.

EXAMPLES

The present invention will be described in more detail below with reference to Examples, but is not limited thereto.

Components with description of their concentrations and solid contents are all accompanied by description of their parts by mass before conversion.

Preparation of Coating Solution

A backing layer-forming coating solution, peeling layer-forming coating solutions A to G, fluorescent layer-forming coating solutions A to V and a to b, and thermofusible ink layer-forming coating solutions A to E and a to b having the following compositions were prepared. Tables 1 to 3 collectively show the compositions of the peeling layer-forming coating solutions, the fluorescent layer-forming coating solutions, and the thermofusible ink layer-forming coating solutions.

<Backing Layer-Forming Coating Solution>

| | |
|---|---|
| Acrylic-modified silicone resin (POLYALLOY NSA-X55, produced by Natoco Co., Ltd.) | 10 parts by mass |
| Methyl ethyl ketone (MEK) | 20 parts by mass |
| Toluene | 20 parts by mass |

<Peeling Layer-Forming Coating Solution A>

| | |
|---|---|
| Carnauba wax (WE-95, produced by Konishi Co., Ltd.) | 100 parts by mass |
| Water | 25 parts by mass |
| Isopropanol (IPA) | 75 parts by mass |

<Peeling Layer-Forming Coating Solution B>

| | |
|---|---|
| Carnauba wax (WE-95, produced by Konishi Co., Ltd.; Solid content: 40%) | 88 parts by mass |
| Vinyl acetate-vinylpyrrolidone copolymer (PVP-VA) (PVP/VA E-335, produced by ISP (Japan) Ltd.; 50% solution in ethanol) | 9.6 parts by mass |
| Water | 25 parts by mass |
| IPA | 75 parts by mass |

<Peeling Layer-Forming Coating Solution C>

| | |
|---|---|
| Carnauba wax (WE-95, produced by Konishi Co., Ltd.; Solid content: 40%) | 98 parts by mass |
| PVP-VA (PVP/VA E-335, produced by ISP (Japan) Ltd.; 50% solution in ethanol) | 1.6 parts by mass |
| Water | 25 parts by mass |
| IPA | 75 parts by mass |

<Peeling Layer-Forming Coating Solution D>

| | |
|---|---|
| Carnauba wax (WE-95, produced by Konishi Co., Ltd.; Solid content: 40%) | 94 parts by mass |
| PVP-VA (PVP/VA E-335, produced by ISP (Japan) Ltd.; 50% solution in ethanol) | 4.8 parts by mass |
| Water | 25 parts by mass |
| IPA | 75 parts by mass |

<Peeling Layer-Forming Coating Solution E>

| | |
|---|---|
| Carnauba wax (WE-95, produced by Konishi Co., Ltd.; Solid content: 40%) | 90 parts by mass |
| PVP-VA (PVP/VA E-335, produced by ISP (Japan) Ltd.; 50% solution in ethanol) | 8 parts by mass |
| Water | 25 parts by mass |
| IPA | 75 parts by mass |

<Peeling Layer-Forming Coating Solution F>

| | |
|---|---|
| Carnauba wax (WE-95, produced by Konishi Co., Ltd.; Solid content: 40%) | 80 parts by mass |
| PVP-VA (PVP/VA E-335, produced by ISP (Japan) Ltd.; 50% solution in ethanol) | 16 parts by mass |
| Water | 25 parts by mass |
| IPA | 75 parts by mass |

<Peeling Layer-Forming Coating Solution G>

| | |
|---|---|
| Paraffin wax (WE-65, produced by Konishi Co., Ltd.; Solid content: 40%) | 40 parts by mass |
| Ethylene-vinyl acetate copolymer (EVAFLEX ® EV250, produced by Dow-Mitsui Polychemicals Company, Ltd.) | 10 parts by mass |
| MEK | 10 parts by mass |
| Toluene | 200 parts by mass |

<Fluorescent Layer-Forming Coating Solution A>

| | |
|---|---|
| Fluorescent material (UVITEX ® NFW, produced by Huntsman International LLC.; 25% solution) | 1 part by mass |
| PVP-VA (PVP/VA E-335, produced by ISP (Japan) Ltd.; 50% solution in ethanol) | 9.5 parts by mass |
| Water | 20 parts by mass |

<Fluorescent Layer-Forming Coating Solution B>

| | |
|---|---|
| Fluorescent material (UVITEX ® NFW, produced by Huntsman International LLC.; 25% solution) | 2 parts by mass |
| PVP-VA (PVP/VA E-335, produced by ISP (Japan) Ltd.; 50% solution in ethanol) | 9 parts by mass |
| Water | 20 parts by mass |
| IPA | 20 parts by mass |

<Fluorescent Layer-Forming Coating Solution C>

| | |
|---|---|
| Fluorescent material (UVITEX ® NFW, produced by Huntsman International LLC.; 25% solution) | 6 parts by mass |
| PVP-VA (PVP/VA E-335, produced by ISP (Japan) Ltd.; 50% solution in ethanol) | 7 parts by mass |
| Water | 20 parts by mass |
| IPA | 20 parts by mass |

<Fluorescent Layer-forming Coating Solution D>

| Fluorescent material (UVITEX ® NFW, produced by Huntsman International LLC.; 25% solution) | 0.6 parts by mass |
|---|---|
| PVP-VA (PVP/VA E-335, produced by ISP (Japan) Ltd.; 50% solution in ethanol) | 9.7 parts by mass |
| Water | 20 parts by mass |
| IPA | 20 parts by mass |

<Fluorescent Layer-Forming Coating Solution E>

| Fluorescent material (UVITEX ® NFW, produced by Huntsman International LLC.; 25% solution) | 0.2 parts by mass |
|---|---|
| PVP-VA (PVP/VA E-335, produced by ISP (Japan) Ltd.; 50% solution in ethanol) | 9.9 parts by mass |
| Water | 20 parts by mass |
| IPA | 20 parts by mass |

<Fluorescent Layer-Forming Coating Solution F>

| Fluorescent material (UVITEX ® NFW, produced by Huntsman International LLC.; 25% solution) | 10 parts by mass |
|---|---|
| PVP-VA (PVP/VA E-335, produced by ISP (Japan) Ltd.; 50% solution in ethanol) | 5 parts by mass |
| Water | 20 parts by mass |
| IPA | 20 parts by mass |

<Fluorescent Layer-Forming Coating Solution G>

| Fluorescent material (UVITEX ® NFW, produced by Huntsman International LLC.; 25% solution) | 1 part by mass |
|---|---|
| Polyvinylpyrrolidone (PVP) (PVP K-15, produced by ISP (Japan) Ltd.) | 4.75 parts by mass |
| Water | 20 parts by mass |
| IPA | 20 parts by mass |

<Fluorescent Layer-Forming Coating Solution H>

| Fluorescent material (UVITEX ® NFW, produced by Huntsman International LLC.; 25% solution in water) | 1 part by mass |
|---|---|
| Polyvinyl alcohol (PVA) (KURARAY POVAL PVA105, produced by Kuraray Co., Ltd.) | 4.75 parts by mass |
| Water | 20 parts by mass |
| IPA | 20 parts by mass |

<Fluorescent Layer-Forming Coating Solution I>

| Fluorescent material (UVITEX ® NFW, produced by Huntsman International LLC.; 25% solution) | 1 part by mass |
|---|---|
| PVP-VA (PVP/VA E-335, produced by ISP (Japan) Ltd.; 50% solution in ethanol) | 7.5 parts by mass |
| Thermocurable resin particle (filler) (EPOSTAR ® S6, produced by Nippon Shokubai Co., Ltd.; Primary particle size: 0.4 μm) | 1 part by mass |
| Water | 20 parts by mass |
| IPA | 20 parts by mass |

<Fluorescent Layer-Forming Coating Solution J>

| Fluorescent material (UVITEX ® NFW, produced by Huntsman International LLC.; 25% solution) | 1 part by mass |
|---|---|
| PVP-VA (PVP/VA E-335, produced by ISP (Japan) Ltd.; 50% solution in ethanol) | 7.5 parts by mass |
| Carnauba wax (WE-95, produced by Konishi Co., Ltd.; Solid content: 40%) | 2.5 parts by mass |
| Water | 20 parts by mass |
| IPA | 20 parts by mass |

<Fluorescent Layer-Forming Coating Solution K>

| Fluorescent material (UVITEX ® NFW, produced by Huntsman International LLC.; 25% solution) | 1 part by mass |
|---|---|
| PVP-VA (PVP/VA E-335, produced by ISP (Japan) Ltd.; 50% solution in ethanol) | 7.5 parts by mass |
| Thermocurable resin particle (EPOSTAR ® S6, produced by Nippon Shokubai Co., Ltd.; Primary particle size: 0.4 μm) | 0.5 parts by mass |
| Carnauba wax (WE-95, produced by Konishi Co., Ltd.; Solid content: 40%) | 1.25 parts by mass |
| Water | 20 parts by mass |
| IPA | 20 parts by mass |

<Fluorescent Layer-Forming Coating Solution L>

| Fluorescent material (UVITEX ® NFW, produced by Huntsman International LLC.; 25% solution) | 1 part by mass |
|---|---|
| PVP-VA (PVP/VA E-335, produced by ISP (Japan) Ltd.; 50% solution in ethanol) | 6.5 parts by mass |
| Thermocurable resin particle (EPOSTAR ® S6, produced by Nippon Shokubai Co., Ltd.; Primary particle size: 0.4 μm) | 0.75 parts by mass |
| Carnauba wax (WE-95, produced by Konishi Co., Ltd.; Solid content: 40%) | 1.875 parts by mass |
| Water | 20 parts by mass |
| IPA | 20 parts by mass |

<Fluorescent Layer-Forming Coating Solution M>

| Fluorescent material (UVITEX ® NFW, produced by Huntsman International LLC.; 25% solution) | 1 part by mass |
|---|---|
| PVP-VA (PVP/VA E-335, produced by ISP (Japan) Ltd.; 50% solution in ethanol) | 6.5 parts by mass |
| Thermocurable resin particle (EPOSTAR. ® S6, produced by Nippon Shokubai Co., Ltd.; Primary particle size: 0.4 μm) | 0.5 parts by mass |
| Carnauba wax (WE-95, produced by Konishi Co., Ltd.; Solid content: 40%) | 2.5 parts by mass |
| Water | 20 parts by mass |
| IPA | 20 parts by mass |

<Fluorescent Layer-Forming Coating Solution N>

| Fluorescent material (UVITEX ® NFW, produced by Huntsman International LLC.; 25% solution) | 1 part by mass |

-continued

| | |
|---|---|
| PVP-VA | 6.5 parts by mass |
| (PVP/VA E-335, produced by ISP (Japan) Ltd.; | |
| 50% solution in ethanol) | |
| Thermocurable resin particle | 1 part by mass |
| (EPOSTAR ® S6, produced by Nippon | |
| Shokubai Co., Ltd.; Primary particle size: 0.4 µm) | |
| Carnauba wax | 1.25 parts by mass |
| (WE-95, produced by Konishi Co., Ltd.; | |
| Solid content: 40%) | |
| Water | 20 parts by mass |
| IPA | 20 parts by mass |

<Fluorescent Layer-Forming Coating Solution O>

| | |
|---|---|
| Fluorescent material | 1 part by mass |
| (UVITEX ® NFW, produced by Huntsman | |
| International LLC.; 25% solution) | |
| PVP-VA | 3.5 parts by mass |
| (PVP/VA E-335, produced by ISP (Japan) Ltd.; | |
| 50% solution in ethanol) | |
| Thermocurable resin particle | 1.5 parts by mass |
| (EPOSTAR ® S6, produced by Nippon | |
| Shokubai Co., Ltd.; Primary particle size: 0.4 µm) | |
| Carnauba wax | 3.75 parts by mass |
| (WE-95, produced by Konishi Co., Ltd.; | |
| Solid content: 40%) | |
| Water | 20 parts by mass |
| IPA | 20 parts by mass |

<Fluorescent Layer-Forming Coating Solution P>

| | |
|---|---|
| Fluorescent material | 1 part by mass |
| (UVITEX ® NFW, produced by Huntsman | |
| International LLC.; 25% solution) | |
| PVP-VA | 6.5 parts by mass |
| (PVP/VA E-335, produced by ISP (Japan) Ltd.; | |
| 50% solution in ethanol) | |
| Thermocurable resin particle (filler) | 0.75 parts by mass |
| (EPOSTAR ® S12, produced by Nippon | |
| Shokubai Co., Ltd.; Primary particle size: 1.2 µm) | |
| Carnauba wax | 1.875 parts by mass |
| (WE-95, produced by Konishi Co., Ltd.; | |
| Solid content: 40%) | |
| Water | 20 parts by mass |
| IPA | 20 parts by mass |

<Fluorescent Layer-Forming Coating Solution Q>

| | |
|---|---|
| Fluorescent material | 1 part by mass |
| (UVITEX ® NFW, produced by Huntsman | |
| International LLC.; 25% solution) | |
| PVP-VA | 6.5 parts by mass |
| (PVP/VA E-335, produced by ISP (Japan) Ltd.; | |
| 50% solution in ethanol) | |
| Thermocurable resin particle (filler) | 0.75 parts by mass |
| (EPOSTAR ® S, produced by Nippon | |
| Shokubai Co., Ltd.; Primary particle size: 0.2 µm) | |
| Carnauba wax | 1.875 parts by mass |
| (WE-95, produced by Konishi Co., Ltd.; | |
| Solid content: 40%) | |
| Water | 20 parts by mass |
| IPA | 20 parts by mass |

<Fluorescent Layer-Forming Coating Solution R>

| | |
|---|---|
| Fluorescent material | 1 part by mass |
| (UVITEX ® NFW, produced by Huntsman | |
| International LLC.; 25% solution) | |
| PVP-VA | 6.5 parts by mass |
| (PVP/VA E-335, produced by ISP (Japan) Ltd.; | |
| 50% solution in ethanol) | |
| Silicone particle (filler) | 0.75 parts by mass |
| (TOSPEARL ® 120, produced by Momentive | |
| Performance Materials Inc.; Primary | |
| particle size: 2.0 µm) | |
| Carnauba wax | 1.875 parts by mass |
| (WE-95, produced by Konishi Co., Ltd.; | |
| Solid content: 40%) | |
| Water | 20 parts by mass |
| IPA | 20 parts by mass |

<Fluorescent Layer-Forming Coating Solution S>

| | |
|---|---|
| Fluorescent material | 1 part by mass |
| (UVITEX ® NFW, produced by Huntsman | |
| International LLC.; 25% solution) | |
| PVP-VA | 6.5 parts by mass |
| (PVP/VA E-335, produced by ISP (Japan) Ltd.; | |
| 50% solution in ethanol) | |
| (Meth)acrylic resin particle (filler) | 0.75 parts by mass |
| (MX-40T, produced by Soken Chemical & | |
| Engineering Co., Ltd.; Primary particle size: | |
| 0.4 µm) | |
| Carnauba wax | 1.875 parts by mass |
| (WE-95, produced by Konishi Co., Ltd.; Solid | |
| content: 40%) | |
| Water | 20 parts by mass |
| IPA | 20 parts by mass |

<Fluorescent Layer-Forming Coating Solution T>

| | |
|---|---|
| Fluorescent material | 1 part by mass |
| (UVITEX ® NFW, produced by Huntsman | |
| International LLC.; 25% solution) | |
| PVP-VA | 6.5 parts by mass |
| (PVP/VA E-335, produced by ISP (Japan) Ltd.; | |
| 50% solution in ethanol) | |
| Silica particle (filler) | 0.75 parts by mass |
| (QCB-100, produced by Shin-Etsu Chemical Co., | |
| Ltd.; Primary particle size: 0.2 µm) | |
| Carnauba wax | 1.875 parts by mass |
| (WE-95, produced by Konishi Co., Ltd.; Solid | |
| content: 40%) | |
| Water | 20 parts by mass |
| IPA | 20 parts by mass |

<Fluorescent Layer-Forming Coating Solution U>

| | |
|---|---|
| Fluorescent material | 1 part by mass |
| (UVITEX ® NFW, produced by Huntsman | |
| International LLC.; 25% solution) | |
| PVP-VA | 6.5 parts by mass |
| (PVP/VA E-335, produced by ISP (Japan) Ltd.; | |
| 50% solution in ethanol) | |
| Fluorine resin particle (filler) | 0.75 parts by mass |
| (KTL-500F, produced by Kitamura Limited; | |
| Primary particle size: 0.5 µm) | |
| Carnauba wax | 1.875 parts by mass |
| (WE-95, produced by Konishi Co., Ltd.; Solid | |
| content: 40%) | |
| Water | 20 parts by mass |
| IPA | 20 parts by mass |

<Fluorescent Layer-forming Coating Solution V>

| | |
|---|---|
| Fluorescent material | 1 part by mass |
| (UVITEX ® NFW, produced by Huntsman International LLC.; 25% solution) | |
| PVP-VA | 6.5 parts by mass |
| (PVP/VA E-335, produced by ISP (Japan) Ltd.; 50% solution in ethanol) | |
| Thermocurable resin particle | 0.75 parts by mass |
| (EPOSTAR ® S6, produced by Nippon Shokubai Co., Ltd.; Primary particle size: 0.4 μm) | |
| Paraffin wax | 1.875 parts by mass |
| (WE-65, produced by Konishi Co., Ltd.; Solid content: 40%) | |
| Water | 20 parts by mass |
| IPA | 20 parts by mass |

<Fluorescent Layer-Forming Coating Solution a>

| | |
|---|---|
| Fluorescent material | 1 part by mass |
| (UVITEX ® NFW, produced by Huntsman International LLC.; 25% solution) | |
| (Meth)acrylic resin | 10.5 parts by mass |
| (BONRON ® S-476, produced by Mitsui Chemicals, Inc.; Solid content: 45%) | |
| Water | 20 parts by mass |
| IPA | 20 parts by mass |

<Fluorescent Layer-Forming Coating Solution b>

| | |
|---|---|
| Fluorescent material | 1 part by mass |
| (UVITEX ® NFW, produced by Huntsman International LLC.; 25% solution) | |
| Polyester resin | 15.8 parts by mass |
| (VYLONAL ® MD-1500, produced by Toyobo Co., Ltd.; Solid content: 30%) | |
| Water | 20 parts by mass |
| IPA | 20 parts by mass |

<Thermofusible Ink Layer-Forming Coating Solution A>

| | |
|---|---|
| Carbon black | 50 parts by mass |
| (C/B#44, produced by Mitsubishi Chemical Corporation) | |
| Ethylene-vinyl acetate copolymer | 30 parts by mass |
| (EVAFLEX ® EV250, produced by Dow-Mitsui Polychemicals Company, Ltd.) | |
| Synthetic petroleum resin | 20 parts by mass |
| (CERAMER 1608, produced by Toyo Adl Corporation) | |
| MEK | 10 parts by mass |
| Toluene | 200 parts by mass |

<Thermofusible Ink Layer-Forming Coating Solution B>

| | |
|---|---|
| Titanium oxide | 60 parts by mass |
| (R-630, produced by Ishihara Sangyo Kaisha, Ltd.) | |
| Ethylene-vinyl acetate copolymer | 20 parts by mass |
| (EVAFLEX ® EV250, produced by Dow-Mitsui Polychemicals Company, Ltd.) | |
| Synthetic petroleum resin | 20 parts by mass |
| (CERAMER 1608, produced by Toyo Adl Corporation) | |
| MEK | 40 parts by mass |
| Toluene | 60 parts by mass |

<Thermofusible Ink Layer-Forming Coating Solution C>

| | |
|---|---|
| Carbon black | 50 parts by mass |
| (C/B#44, produced by Mitsubishi Chemical Corporation) | |
| Ethylene-vinyl acetate copolymer | 30 parts by mass |
| (EVAFLEX ® EV250, produced by Dow-Mitsui Polychemicals Company, Ltd.) | |
| Terpene phenol | 20 parts by mass |
| (YS POLYSTAR T100, produced by Yasuhara Chemical Co., Ltd.) | |
| MEK | 10 parts by mass |
| Toluene | 200 parts by mass |

<Thermofusible Ink Layer-Forming Coating Solution D>

| | |
|---|---|
| Carbon black | 50 parts by mass |
| (C/B#44, produced by Mitsubishi Chemical Corporation) | |
| Ethylene-vinyl acetate copolymer | 30 parts by mass |
| (EVAFLEX ® EV250, produced by Dow-Mitsui Polychemicals Company, Ltd.) | |
| Terpene phenol | 20 parts by mass |
| (YS POLYSTAR T100, produced by Yasuhara Chemical Co., Ltd.) | |
| MEK | 10 parts by mass |
| Toluene | 200 parts by mass |

<Thermofusible Ink Layer-Forming Coating Solution E>

| | |
|---|---|
| Carbon black | 50 parts by mass |
| (C/B#44, produced by Mitsubishi Chemical Corporation) | |
| Ethylene-vinyl acetate copolymer | 30 parts by mass |
| (EVAFLEX ® EV250, produced by Dow-Mitsui Polychemicals Company, Ltd.) | |
| Paraffin wax | 20 parts by mass |
| (HNP-10, produced by Nippon Seiro Co., Ltd.) | |
| Silica | 10 parts by mass |
| (AEROSIL R972, produced by Nippon Aerosil Co., Ltd.) | |
| MEK | 10 parts by mass |
| Toluene | 200 parts by mass |

<Thermofusible Ink Layer-Forming Coating Solution a>

| | |
|---|---|
| Carbon black | 45 parts by mass |
| (C/B#44, produced by Mitsubishi Chemical Corporation) | |
| Fluorescent material | 10 parts by mass |
| (DOUBLETEX OB, produced by Double Bond Chemical Ind., Co., Ltd.) | |
| Ethylene-vinyl acetate copolymer | 27 parts by mass |
| (EVAFLEX ® EV250, produced by Dow-Mitsui Polychemicals Company, Ltd.) | |
| Synthetic petroleum resin | 18 parts by mass |
| (CERAMER 1608, produced by Toyo Adl Corporation) | |
| MEK | 10 parts by mass |
| Toluene | 200 parts by mass |

<Thermofusible Ink Layer-Forming Coating Solution b>

| | |
|---|---|
| Carbon black | 35 parts by mass |
| (C/B#44, produced by Mitsubishi Chemical Corporation) | |
| Fluorescent material | 30 parts by mass |
| (DOUBLETEX OB, produced by Double Bond Chemical Ind., Co., Ltd.) | |

-continued

| | |
|---|---|
| Ethylene-vinyl acetate copolymer (EVAFLEX ® EV250, produced by Dow-Mitsui Polychemicals Company, Ltd.) | 21 parts by mass |
| Synthetic petroleum resin (CERAMER 1608, produced by Toyo Adl Corporation) | 14 parts by mass |
| MEK | 10 parts by mass |
| Toluene | 200 parts by mass |

Example 1

The backing layer-forming coating solution described above was applied to one surface of a biaxially stretched PET film having a thickness of 4.5 μm and dried to form a backing layer having a thickness of 0.06 μm.

Next, the peeling layer-forming coating solution A described above was applied to the other surface of the PET film and dried to form a peeling layer having a thickness of 0.70 μm.

The fluorescent layer-forming coating solution A was applied to the peeling layer formed as described above and dried to form a fluorescent layer having a thickness of 0.40 μm.

The thermofusible ink layer-forming coating solution A was applied to the fluorescent layer formed as described above and dried to form a thermofusible ink layer having a thickness of 0.80 μm, thereby obtaining a thermal transfer sheet.

Examples 2 to 38 and Comparative Examples 1 to 4

Thermal transfer sheets were obtained in the same manner as in Example 1 except that the peeling layer-forming coating solution, the fluorescent layer-forming coating solution and/or the thermofusible ink layer-forming coating solution was/were changed as shown in Table 4.

It is noted that in Example 9 the thickness of the thermofusible ink layer was also changed. In Comparative Examples 1 and 2, no fluorescent layer was provided.

«Measurement of Fluorescence Intensity Ratio»

The thermal transfer sheet obtained in the Example 1 was irradiated with an ultraviolet light at an excitation wavelength of 365 nm from the side provided with the thermofusible ink layer, where the substrate is arranged at the center, to make the fluorescent layer emit a light. Then, from the side where ultraviolet light was irradiated, the fluorescence intensity was measured at 470 nm using a fluorescence spectrophotometer (FP-6600, produced by JASCO Corporation) to obtain a value of 5.

Next, from the side not provided with the thermofusible ink layer, where the substrate is arranged at the center, the thermal transfer sheet was irradiated with an ultraviolet light in the same manner, and then the fluorescence intensity was measured to obtain a value of 32.

The ratio between the fluorescence intensities A and B (B/A) was 6.40 (32/5), wherein the fluorescence intensity A is measured via an ultraviolet light irradiation to the thermal transfer sheet from the side provided with the thermofusible ink layer, where the substrate is arranged at the center; and wherein the fluorescence intensity B is measured via an ultraviolet light irradiation to the thermal transfer sheet from the side not provided with the thermofusible ink layer, where the substrate is arranged at the center. Fluorescence intensity ratios from other Examples and Comparative Examples were also measured and calculated in the same manner, and are collectively shown in Table 4.

«Fluorescence Intensity Test»

Using the thermal transfer sheets obtained in the Examples and Comparative Examples, and a laminated film of an oriented stretched polypropylene (OPP) film and a cast polypropylene (CPP) film (hereinafter referred to as OPP-CPP laminated film) as a transfer object, two-dot character patterns and bar codes were printed on the OPP film side of the OPP-CPP laminated film.

As a thermofusible transfer printer, SD3C with a thermal head having a resolution of 300 dpi, produced by Markem-Imaje Corporation, was used under conditions of a printing speed of 15 m/min, a printing density (Darkness) of 130%.

The character patterns and bar codes printed as described above were irradiated with an ultraviolet light at an excitation wavelength of 365 nm to emit a light, and then measured for the fluorescence intensity at 470 nm from the side where the ultraviolet light was irradiated using a fluorescence spectrophotometer (FP-6600, produced by JASCO Corporation) and evaluated according to the following Evaluation Criteria. Table 4 collectively shows the evaluation results. In addition, Table 4 collectively shows the fluorescence intensity values.

(Evaluation Criteria)
A: The fluorescence intensity was 15 or more.
B: The fluorescence intensity was 10 or more and less than 15.
NG: The fluorescence intensity was less than 10.

«High-Speed Transferability Test»

A two-dot character pattern and bar code were printed on the OPP film side of the OPP-CPP laminated film in the same manner as in the fluorescence intensity test, except that SDX60 with a thermal head having a resolution of 300 dpi, produced by Markem-Imaje Corporation, was used instead of the thermofusible transfer printer used in the fluorescence intensity test, and the printing speed at a printing density (Darkness) of 130% was changed to the speeds shown in Table 4.

The states of the thus-printed character pattern and bar code were visually inspected, and evaluated for the high-speed transferability according to the following Evaluation Criteria. Table 4 collectively shows the evaluation results.

(Evaluation Criteria)
A: Success in printing a character pattern and bar code without printing omission or faint printing.
B: Slight printing omission and/or faint printings observed in the printed character pattern and bar code.
NG: Printing omission and/or faint printings observed in the printed character pattern and bar code.

«Abrasion Resistance Test»

The bar code printed in the fluorescence intensity test was rubbed three times with the index finger, and then irradiated with an ultraviolet light at an excitation wavelength of 365 nm to emit light. The abrasion resistance of the printed bar code was evaluated according to the following Evaluation Criteria. Table 4 collectively shows the evaluation results.

(Evaluation Criteria)
A: No luminescence was observed except at the portion where the bar code was printed.
B: The fluorescent material was removed by rubbing and slightly contaminated the non-printed area, resulting in slight emission of light from the portion other than where the bar code was printed, but the bar code was able to be identified.
NG: The fluorescent material was removed by rubbing and contaminated the non-printed area, resulting in emission of light from the portion other than where the bar code was printed, so that the bar code was difficult to identify.

«Excessive Peeling Resistance Test»

The thermal transfer sheets obtained in the Examples and Comparative Examples, and an OPP-CPP laminated film as a transfer object, and a thermofusible transfer printer (SD3C, produced by Markem-Imaje Corporation) with a thermal head having a resolution of 300 dpi were prepared.

The transfer layer included in the thermal transfer sheet was transferred to the OPP film side of the OPP-CPP laminated film under conditions of a printing speed of 30 m/min and a printing density (Darkness) of 130% to form 10 character patterns "8". The printed patterns were visually inspected, and the excessive peeling resistance of the thermal transfer sheet was evaluated according to the following Evaluation Criteria. Table 4 collectively shows the evaluation results.

(Evaluation Criteria)

A: The formed printing patterns were not crushed, confirming that the thermal transfer sheet had high excessive peeling resistance.

Figure 3:
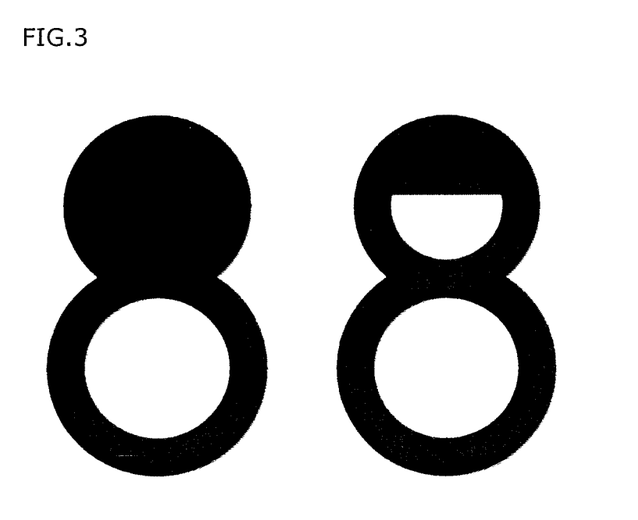
FIG. 3 shows printing patterns with excessive peeling.

B: Of 10 printing patterns "8" printed, not more than two printing patterns were crushed as shown in FIG. 3, which was not practically problematic.

C: Of 10 printing patterns "8" printed, three or more printing patterns were crushed as shown in FIG. 3, indicating that there was a problem with the excessive peeling resistance of the thermal transfer sheet.

«Blocking Resistance Test»

Two sheets of each of the thermal transfer sheets obtained in the Examples and Comparative Examples were prepared, stacked such that the thermofusible ink layer and the backing layer faced, and then left to stand for 24 hours at 45° C. under a pressure of 1.176 MPa. After completion of the standing, the two thermal transfer sheets were peeled off and evaluated for the blocking resistance according to the following Evaluation Criteria. Table 4 collectively shows the evaluation results.

(Evaluation Criteria)

A: The two thermal transfer sheets were peeled off with no difficulty.

B: Due to adherence between the thermofusible ink layer and the backing layer, the two thermal transfer sheets needed some force to be peeled off.

C: Due to strong adherence between the thermofusible ink layer and the backing layer, the two thermal transfer sheets were not able to be peeled off.

TABLE 1

| | Composition of peeling layer-forming coating solution | |
|---|---|---|
| | Type of resin material | Content of resin material (% by mass) |
| Peeling layer-forming coating solution A | — | — |
| Peeling layer-forming coating solution B | PVP-VA | 12 |
| Peeling layer-forming coating solution C | PVP-VA | 2 |
| Peeling layer-forming coating solution D | PVP-VA | 6 |
| Peeling layer-forming coating solution E | PVP-VA | 10 |
| Peeling layer-forming coating solution F | PVP-VA | 20 |
| Peeling layer-forming coating solution G | Ethylene-vinyl acetate copolymer | 38.4 |

TABLE 2

| | Composition of fluorescent layer-forming coating solution | | | | | | |
|---|---|---|---|---|---|---|---|
| | Content of fluorescent material (% by mass) | Type of resin material | Type of filler | Content of filler (% by mass) | Primary particle size of filler (μm) | Type of wax | Content of wax (% by mass) | Sum of contents of filler and wax (% by mass) |
| Fluorescent layer-forming coating solution A | 5 | PVP-VA | — | — | — | — | — | — |
| Fluorescent layer-forming coating solution B | 10 | PVP-VA | — | — | — | — | — | — |
| Fluorescent layer-forming coating solution C | 30 | PVP-VA | — | — | — | — | — | — |
| Fluorescent layer-forming coating solution D | 3 | PVP-VA | — | — | — | — | — | — |
| Fluorescent layer-forming coating solution E | 1 | PVP-VA | — | — | — | — | — | — |
| Fluorescent layer-forming coating solution F | 50 | PVP-VA | — | — | — | — | — | — |
| Fluorescent layer-forming coating solution G | 5 | PVP | — | — | — | — | — | — |
| Fluorescent layer-forming coating solution H | 5 | PVA | — | — | — | — | — | — |

TABLE 2-continued

| | Composition of fluorescent layer-forming coating solution | | | | | | | |
|---|---|---|---|---|---|---|---|---|
| | Content of fluorescent material (% by mass) | Type of resin material | Type of filler | Content of filler (% by mass) | Primary particle size of filler (μm) | Type of wax | Content of wax (% by mass) | Sum of contents of filler and wax (% by mass) |
| Fluorescent layer-forming coating solution I | 5 | PVP-VA | thermocurable resin particle | 20 | 0.4 | — | — | 20 |
| Fluorescent layer-forming coating solution J | 5 | PVP-VA | — | — | — | carnauba wax | 20 | 20 |
| Fluorescent layer-forming coating solution K | 5 | PVP-VA | Thermocurable resin particle | 10 | 0.4 | carnauba wax | 10 | 20 |
| Fluorescent layer-forming coating solution L | 5 | PVP-VA | thermocurable resin particle | 15 | 0.4 | carnauba wax | 15 | 30 |
| Fluorescent layer-forming coating solution M | 5 | PVP-VA | thermocurable resin particle | 10 | 0.4 | carnauba wax | 20 | 30 |
| Fluorescent layer-forming coating solution N | 5 | PVP-VA | thermocurable resin particle | 20 | 0.4 | carnauba wax | 10 | 30 |
| Fluorescent layer-forming coating solution O | 5 | PVP-VA | thermocurable resin particle | 30 | 0.4 | carnauba wax | 30 | 60 |
| Fluorescent layer-forming coating solution P | 5 | PVP-VA | thermocurable resin particle | 15 | 1.2 | carnauba wax | 15 | 30 |
| Fluorescent layer-forming coating solution Q | 5 | PVP-VA | thermocurable resin particle | 15 | 0.2 | carnauba wax | 15 | 30 |
| Fluorescent layer-forming coating solution R | 5 | PVP-VA | silicone particle | 15 | 2.0 | carnauba wax | 15 | 30 |
| Fluorescent layer-forming coating solution S | 5 | PVP-VA | (meth)acrylic resin particle | 15 | 0.4 | carnauba wax | 15 | 30 |
| Fluorescent layer-forming coating solution T | 5 | PVP-VA | silica particle | 15 | 0.2 | carnauba wax | 15 | 30 |
| Fluorescent layer-forming coating solution U | 5 | PVP-VA | fluorine resin particle | 15 | 0.5 | carnauba wax | 15 | 30 |
| Fluorescent layer-forming coating solution V | 5 | PVP-VA | thermocurable resin particle | 15 | 0.4 | paraffin wax | 15 | 30 |
| Fluorescent layer-forming coating solution a | 5 | (meth)acrylic resin | — | — | — | — | — | — |
| Fluorescent layer-forming coating solution b | 5 | polyester resin | — | — | — | — | — | — |

TABLE 3

| Table 3 | Composition of thermofusible ink layer-forming coating solution | |
|---|---|---|
| | Content of colorant (% by mass) | Presence of fluorescent material |
| Thermofusible ink layer-forming coating solution A | 50 | Absent |
| Thermofusible ink layer-forming coating solution B | 60 | Absent |
| Thermofusible ink layer-forming coating solution C | 50 | Absent |
| Thermofusible ink layer-forming coating solution D | 50 | Absent |
| Thermofusible ink layer-forming coating solution E | 50 | Absent |
| Thermofusible ink layer-forming coating solution a | 45 | Present |
| Thermofusible ink layer-forming coating solution b | 35 | Present |

TABLE 4

| | Peeling layer-forming coating solution | Fluorescent layer-forming coating solution | Thermofusible ink layer-forming coating solution | Thickness of thermofusible ink layer (μm) | Fluorescence intensity ratio of front and back (B/A) | Performance evaluation of thermal transfer sheet Fluorescence intensity Eval. | Value |
|---|---|---|---|---|---|---|---|
| Example 1 | A | A | A | 0.8 | 6.40 (B = 32, A = 5) | A | 30 |
| Example 2 | A | B | A | 0.8 | 6.38 (B = 51, A = 8) | A | 50 |
| Example 3 | A | C | A | 0.8 | 4.10 (B = 82, A = 20) | A | 78 |
| Example 4 | A | D | A | 0.8 | 3.75 (B = 15, A = 4) | A | 15 |
| Example 5 | A | E | A | 0.8 | 5.50 (B = 11, A = 2) | B | 10 |
| Example 6 | A | F | A | 0.8 | 3.50 (B = 105, A = 30) | A | 100 |
| Example 7 | A | G | A | 0.8 | 5.80 (B = 29, A = 5) | A | 28 |
| Example 8 | A | H | A | 0.8 | 5.40 (B = 27, A = 5) | A | 25 |
| Example 9 | A | A | B | 2.0 | 3.57 (B = 100, A = 28) | A | 95 |
| Example 10 | A | I | A | 0.8 | 6.40 (B = 32, A = 5) | A | 30 |
| Example 11 | A | J | A | 0.8 | 6.40 (B = 32, A = 5) | A | 30 |
| Example 12 | A | K | A | 0.8 | 6.00 (B = 30, A = 5) | A | 28 |
| Example 13 | A | L | A | 0.8 | 6.00 (B = 30, A = 5) | A | 28 |
| Example 14 | A | M | A | 0.8 | 6.00 (B = 30, A = 5) | A | 28 |
| Example 15 | A | N | A | 0.8 | 5.80 (B = 29, A = 5) | A | 27 |
| Example 16 | A | O | A | 0.8 | 4.00 (B = 12, A = 3) | B | 12 |
| Example 17 | B | I | A | 0.8 | 6.40 (B = 32, A = 5) | A | 30 |
| Example 18 | B | J | A | 0.8 | 6.40 (B = 32, A = 5) | A | 30 |
| Example 19 | B | K | A | 0.8 | 6.00 (B = 30, A = 5) | A | 30 |
| Example 20 | B | L | A | 0.8 | 6.00 (B = 32, A = 5) | A | 30 |
| Example 21 | B | M | A | 0.8 | 6.00 (B = 30, A = 5) | A | 30 |
| Example 22 | B | N | A | 0.8 | 5.80 (B = 29, A = 5) | A | 30 |
| Example 23 | B | O | A | 0.8 | 5.80 (B = 29, A = 5) | A | 30 |
| Example 24 | B | P | A | 0.8 | 6.00 (B = 30, A = 5) | A | 30 |
| Example 25 | B | Q | A | 0.8 | 6.00 (B = 30, A = 5) | A | 30 |
| Example 26 | B | R | A | 0.8 | 6.00 (B = 30, A = 5) | A | 30 |
| Example 27 | B | S | A | 0.8 | 6.00 (B = 30, A = 5) | A | 30 |
| Example 28 | B | T | A | 0.8 | 6.00 (B = 30, A = 5) | A | 30 |
| Example 29 | B | U | A | 0.8 | 6.00 (B = 30, A = 5) | A | 30 |
| Example 30 | B | V | A | 0.8 | 6.00 (B = 30, A = 5) | A | 30 |
| Example 31 | B | V | C | 0.8 | 6.40 (B = 32, A = 5) | A | 30 |
| Example 32 | C | A | A | 0.8 | 6.40 (B = 32, A = 5) | A | 30 |
| Example 33 | D | A | A | 0.8 | 6.40 (B = 32, A = 5) | A | 30 |
| Example 34 | E | A | A | 0.8 | 6.40 (B = 32, A = 5) | A | 30 |

TABLE 4-continued

| | | | | | | | |
|---|---|---|---|---|---|---|---|
| Example 35 | B | A | A | 0.8 | 6.40 (B = 32, A = 5) | A | 30 |
| Example 36 | F | A | A | 0.8 | 6.40 (B = 32, A = 5) | A | 30 |
| Example 37 | A | A | D | 0.8 | 6.40 (B = 32, A = 5) | A | 30 |
| Example 38 | G | A | E | 0.8 | 6.20 (B = 31, A = 5) | A | 30 |
| Comparative Example 1 | A | — | a | 0.8 | 1.00 (B = 8, A = 8) | NG | 8 |
| Comparative Example 2 | A | — | b | 0.8 | 1.02 (B = 56, A = 55) | A | 55 |
| Comparative Example 3 | A | a | A | 0.8 | 4.33 (B = 13, A = 3) | B | 13 |
| Comparative Example 4 | A | b | A | 0.8 | 4.67 (B = 14, A = 3) | B | 11 |

| | Performance evaluation of thermal transfer sheet | | | | | | | |
|---|---|---|---|---|---|---|---|---|
| | High-speed transferability | | | | | Abrasion resistance | Excessive peeling resistance | Blocking resistance |
| | 20 m/min | 25 m/min | 30 m/min | 35 m/min | 40 m/min | | | |
| Example 1 | A | A | A | A | A | A | C | C |
| Example 2 | A | A | A | A | A | A | C | C |
| Example 3 | A | A | A | A | A | A | C | C |
| Example 4 | A | A | A | A | A | A | C | C |
| Example 5 | A | A | A | A | A | A | C | C |
| Example 6 | A | A | A | A | A | B | C | C |
| Example 7 | A | A | A | B | B | A | C | C |
| Example 8 | A | A | A | B | B | A | C | C |
| Example 9 | A | A | A | A | B | A | C | C |
| Example 10 | A | A | A | A | A | A | C | C |
| Example 11 | A | A | A | A | A | A | C | C |
| Example 12 | A | A | A | A | A | A | B | C |
| Example 13 | A | A | A | A | A | A | A | C |
| Example 14 | A | A | A | A | A | A | A | C |
| Example 15 | A | A | A | A | A | A | A | C |
| Example 16 | A | A | A | A | A | A | A | C |
| Example 17 | A | A | A | A | A | A | C | A |
| Example 18 | A | A | A | A | A | A | C | A |
| Example 19 | A | A | A | A | A | A | B | A |
| Example 20 | A | A | A | A | A | A | A | A |
| Example 21 | A | A | A | A | A | A | A | A |
| Example 22 | A | A | A | A | A | A | A | A |
| Example 23 | A | A | A | A | A | B | A | A |
| Example 24 | A | A | A | A | A | A | A | A |
| Example 25 | A | A | A | A | A | A | B | A |
| Example 26 | A | A | A | A | A | A | B | A |
| Example 27 | A | A | A | A | A | A | A | A |
| Example 28 | A | A | A | A | A | A | B | A |
| Example 29 | A | A | A | A | A | A | A | A |
| Example 30 | A | A | A | A | A | A | A | A |
| Example 31 | A | A | A | A | A | A | A | A |
| Example 32 | A | A | A | A | A | A | C | B |
| Example 33 | A | A | A | A | A | A | C | A |
| Example 34 | A | A | A | A | A | A | C | A |
| Example 35 | A | A | A | A | A | A | C | A |
| Example 36 | A | A | A | B | B | A | C | A |
| Example 37 | A | A | A | A | A | A | C | C |
| Example 38 | A | A | A | A | A | A | C | C |
| Comparative Example 1 | A | A | A | A | A | B | C | C |
| Comparative Example 2 | A | A | A | A | A | NG | C | C |
| Comparative Example 3 | A | A | B | NG | NG | A | C | C |
| Comparative Example 4 | A | B | B | NG | NG | A | C | C |

REFERENCE SIGNS LIST

10: Thermal transfer sheet
11: Substrate
12: Fluorescent layer
13: Thermofusible ink layer
14: Peeling layer
15: Backing layer

The invention claimed is:

1. A thermal transfer sheet, comprising, in this order:
a substrate;
a fluorescent layer; and
a thermofusible ink layer,
wherein the fluorescent layer contains a fluorescent material, and a vinyl acetate-vinylpyrrolidone copolymer, a first particle, and a second particle that is different from the first particle, and
wherein the first particle is at least one particle selected from the group consisting of a thermocurable resin particle, a (meth)acrylic resin particle, a silicon-containing resin particle, a fluorine-containing resin particle, a silica particle, an alumina particle, a clay particle, a talc particle, a calcium carbonate particle, a barium oxide particle, a zinc oxide particle, a titanium oxide particle and a glass bead.

2. The thermal transfer sheet according to claim 1, wherein fluorescence intensities A and B satisfy the following formula:

$$B/A \geq 3,$$

wherein the fluorescence intensity A is obtained by irradiating the thermal transfer sheet with an ultraviolet light at an excitation wavelength of 365 nm from the side provided with the thermofusible ink layer, where the substrate is arranged at the center; thereby making the fluorescent layer emit a light; and then measuring the fluorescence intensity at 470 nm using a fluorescence spectrophotometer, and
wherein the fluorescence intensity B is obtained by irradiating the thermal transfer sheet with an ultraviolet light at an excitation wavelength of 365 nm from the side not provided with the thermofusible ink layer, where the substrate is arranged at the center; thereby making the fluorescent layer emit a light, and then measuring the fluorescence intensity at 470 nm using a fluorescence spectrophotometer.

3. The thermal transfer sheet according to claim 1, wherein the fluorescent layer has a thickness of 0.1 μm or more and 1.5 μm or less.

4. The thermal transfer sheet according to claim 1, wherein the content of the fluorescent material in the fluorescent layer is 0.1% by mass or more and 60% by mass or less.

5. The thermal transfer sheet according to claim 1, further comprising a peeling layer between the substrate and the fluorescent layer.

6. The thermal transfer sheet according to claim 1, wherein the first particle is a filler having a melting point of 120° C. or higher.

7. The thermal transfer sheet according to claim 1, wherein the first particle has a primary particle size of 0.1 μm or more and 2 μm or less.

8. The thermal transfer sheet according to claim 1, wherein the second particle has a melting point of lower than 120° C.

9. The thermal transfer sheet according to claim 1, wherein the second particle is wax.

10. The thermal transfer sheet according to claim 1, wherein the sum of the contents of the first particle and the second particle in the fluorescent layer is 15% by mass or more and 65% by mass or less.

11. The thermal transfer sheet according to claim 5, wherein the peeling layer contains a vinyl resin.

12. The thermal transfer sheet according to claim 11, wherein a content of the vinyl resin in the peeling layer is in a range of 2% by mass or more to 25% by mass or less.

13. The thermal transfer sheet according to claim 11, wherein the peeling layer contains a vinyl acetate-vinylpyrrolidone copolymer as the vinyl resin.

14. The thermal transfer sheet according to claim 1, wherein the thermocurable resin particle is at least one particle selected from the group consisting of a benzoguanamine-formaldehyde copolymer, a benzoguanamine-melamine-formaldehyde copolymer, and a melamine-formaldehyde copolymer.

* * * * *